(No Model.)
G. A. SMITH.
FRUIT PICKER.
No. 291,792.  Patented Jan. 8, 1884.
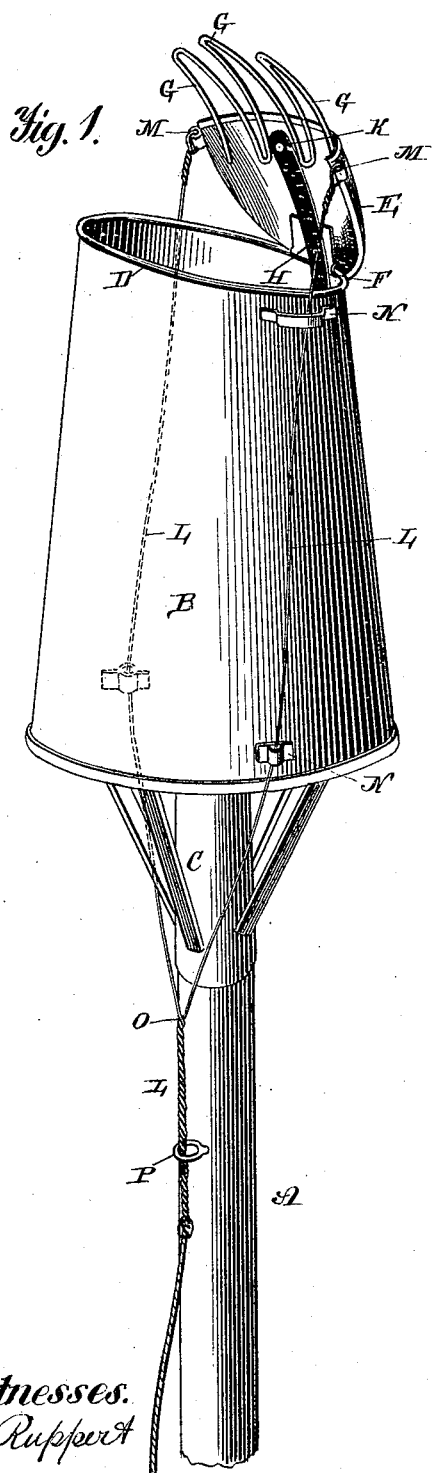
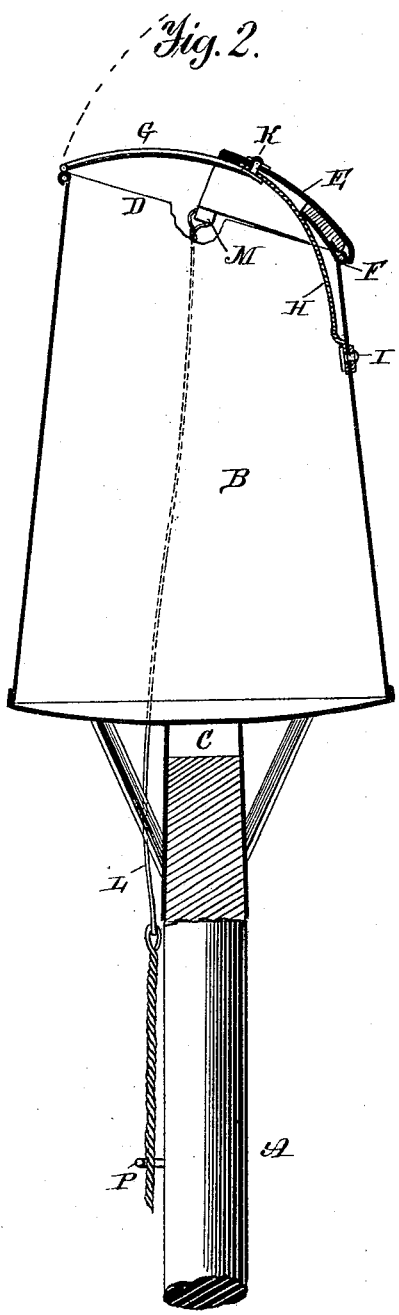
Fig. 1.
Fig. 2.
Witnesses.
A. Ruppert
J. W. Garner
Inventor:
Gilbert A. Smith
by H. J. England, Atty.

United States Patent Office.

GILBERT A. SMITH, OF DAVENPORT CENTRE, NEW YORK.

FRUIT-PICKER.

SPECIFICATION forming part of Letters Patent No. 291,792, dated January 8, 1884.

Application filed November 27, 1883. (No model.)

*To all whom it may concern:*

Be it known that I, GILBERT A. SMITH, a citizen of the United States, residing at Davenport Centre, in the county of Delaware and State of New York, have invented certain new and useful Improvements in Fruit-Pickers, of which the following is a specification, reference being had therein to the accompanying drawings.

My invention relates to an improvement in fruit-gatherers; and it consists in the peculiar construction and combination of devices that will be more fully described hereinafter, whereby a cheap, simple, and effective fruit-gatherer is produced.

In the accompanying drawings, which fully illustrate my invention, Figure 1 is a perspective view. Fig. 2 is a vertical central sectional view.

Similar letters of reference indicate like parts in both the figures.

A represents a staff or handle of suitable length to enable the operator to reach the fruit in the trees. Upon one end of the staff is rigidly secured a vessel, B, by means of the socket-joint C. This vessel is preferably made of sheet metal, and is slightly conical in shape, its greatest diameter being at its lower end. The upper edge of the vessel is slightly beveled, as at D. Upon the lower side of this beveled edge is hinged the segmental cover E, as at F. This segmental cover is concave in cross-section, and is of sufficient size to about half cover the upper end of the receiving-vessel B.

G represents a series of wire jaws, which are bent into shape from a single piece of wire, and rigidly secured at their inner ends to the under side of the outer edge of the segmental cover E, their outer ends extending out sufficiently far to reach the outer edge of the receiving-vessel. The jaws G and the segmental cover E thus form a complete cover for the vessel B.

H represents a metallic spring, which is rigidly secured at its lower end to the inner rear side of the vessel B, as at I, the upper end of the spring bearing against and being secured to the under side of the segmental cover E, as at K. The function of this spring is to keep the hinged lid of the vessel normally open, as shown at Fig. 1.

L L represent cords or wires, which are secured at their upper ends to ears M, with which the segmental cover is provided, and extend down along the outer sides of the vessel B through loops N, and are joined and twisted together at a suitable point, O, below the vessel, and from these extend down as a single wire or cord along the staff A, being secured loosely thereto by the keepers P.

The operation of my invention is as follows: The vessel B is of a size to contain a small quantity of the fruit. The operator stands upon the ground and directs the gatherer, so as to cause it to be directly beneath the fruit that it is desired to pull, two of the jaws G passing on both sides of the stem thereof. The cord or wire L is then pulled, which causes the lid to close, the jaws in their movement severing the fruit from the limb, when it drops into the receiving-vessel. This operation is repeated until the vessel is filled, when it is emptied, and the operation then proceeds as before.

By the use of an implement of this construction fruit may be easily and expeditiously gathered from the tree without bruising and injuring it.

Having thus described my invention, I claim—

The combination of the staff A, receiving-vessel B, hinged cover E, having the jaws G, spring H, and operating cord or wire L, all combined and arranged to operate substantially as shown and described.

In testimony whereof I affix my signature in presence of two witnesses.

GILBERT A. SMITH.

Witnesses:
WILLIAM H. ROBERTS,
BARNEY SMITH.